Dec. 23, 1952     L. E. SHAW     2,622,446
VARIABLE-SPEED TRANSMISSION

Filed April 22, 1948     2 SHEETS—SHEET 1

LOUIS EATON SHAW
*INVENTOR.*

BY *[signature]*
*attorney*

Dec. 23, 1952     L. E. SHAW     2,622,446
VARIABLE-SPEED TRANSMISSION

Filed April 22, 1948     2 SHEETS—SHEET 2

LOUIS EATON SHAW
*INVENTOR.*

BY *[signature]*
*Attorney*

Patented Dec. 23, 1952

2,622,446

UNITED STATES PATENT OFFICE 2,622,446

VARIABLE-SPEED TRANSMISSION

Louis Eaton Shaw, East Orange, N. J.

Application April 22, 1948, Serial No. 22,642

6 Claims. (Cl. 74—230.17)

This invention relates to variable speed power transmissions and more particularly to a variable speed transmission embodying a variable-pitch motor or driving pulley the effective diameter of which is varied by axial movement of one flange of the pulley or sheave relative to the other flange thereof.

Existing similar variable speed devices are unsatisfactory in many respects among which are that speed changes can only be effected while the belt of the drive is in motion; the relatively great force required to spread apart the flanges of the variable-pitch pulley or sheave; the serious jerking of the belt when the motor is started and the fact that to provide a slow start of a driven machine with subsequent bringing of it gradually up to operating speed it is necessary to reduce the speed of the machine before shutting off or stopping the motor prior to the subsequent starting.

It is an object of the present invention to provide a variable speed power transmission which will overcome the above disadvantages which embodies a centrifugally operated motor or drive pulley in which movement of the movable flange is effected by centrifugal action.

More specifically the present invention comprises a motor or drive pulley having an axially stationary and an axially movable flange, variation of their relative positions providing variation of the pitch diameter of the pulley with consequent variation in speed of the power transmitting belt operating thereon, together with a plurality of weights so constructed and arranged that through centrifugal action they force the movable flange towards the stationary flange. Thus when the motor is not running it may be drawn away from the driven pulley of the drive with practically no effort or required force since centrifugal force is absent under such condition and there is, therefore, no pressure of the flanges against the belt.

However, the moment the motor is started the weights tend to fly outward and the resulting force from their rotation is translated into a tendency to move the movable flange of the pulley axially closer to its companion stationary flange. The magnitude of this force is dependent on the mass of the weights, their distance from the center of rotation and the speed at which they revolve, and by proper consideration of all of these factors the pulley may be accurately designed for any given horsepower rating.

The invention also comprises novel means for mounting the motor which permits its adjustment towards or from the driven machine or pulley for providing speed variances in the transmission of the power from the motor to the driven element and also means for slight limited lateral movement of the motor to compensate for variances in the active width of the driving pulley so as to maintain alignment of the driving and driven pulleys under all speed variance adjustments and which means will also permit the driven machine to always start at low speed, if so desired, and pick up automatically to a predetermined speed, such means utilizing the weight of the motor itself to effect the desired result.

With these and other objects in view, as may appear from the accompanying specification, the invention consists of various features of construction and combination of parts, which will be first described in connection with the accompanying drawings, showing a variable speed power transmission of a preferred form embodying the invention, and the features forming the invention will be specifically pointed out in the claims.

Figure 1:
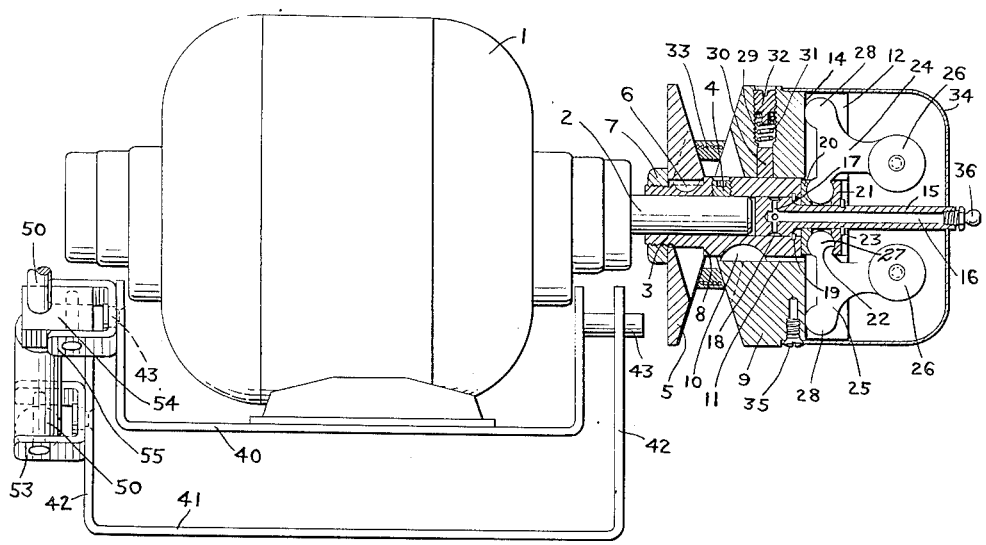
Figure 1 is a view partly in side elevation and partly in section of the improved variable speed drive.

Referring more particularly to the drawings, the motor 1 which constitutes the driver or prime mover has the usual driving shaft 2 thereon. A sleeve 3 is mounted on the motor shaft 2 and is held thereon by a set screw 4. The variable-pitch power transmitting pulley or sheave includes the flange 5 which is fixed to the sleeve 3 by a key 6 and a nut 7 threaded on the inner end of the sleeve, which thread forces the inner side of the flange 5 at its central portion against the shoulder 8 formed on the sleeve 3. Opposing the stationary flange 5 is the shiftable flange 9 which cooperates with the stationary flange 5 to form the variable grooved pulley or sheave. The shiftable flange 9 is slidably mounted upon the sleeve 3 and is keyed thereto to prevent rotation of the flange 9 relative to the sheave but to permit axial movement of the flange 9 relative to the sheave by a key 10 and a keyway 11. The flange 9 is provided with a diametric slot 12 extending inwardly from its rear face 13 and the bottom of the slot 12 forms an abutment surface 14. The sleeve 3 projects outwardly beyond the end of the driving shaft 2 and has the inner large end of a two diameter shaft 15 driven thereinto, as clearly shown in Figures 1 and 3 of the drawings. The shaft 15 is drilled to provide a longitudinally extending lubricant passage 16 and radial lubricant passages 17, which radial lubricant passages open out into an annular groove 18 which forms an annular channel for conducting grease or lubricant to supply the lubricant to the sliding surface between the sleeve 3 and the shiftable flange 9. The shaft 15 is held against movement in the right-hand direction by a snap ring 19 of any approved construction.

Fitting on the smaller diameter of the shaft 15 are two washers 20 and 21 spaced predetermined distances apart and forming, between them, a toroidal space 22. The washer 20 abuts against the outer end of the sleeve 3 while the washer 21 is held at the proper distance from the washer 20 by a suitable snap ring 23.

Bell cranks 24 and 25 which are formed of flat metal extend into the slot 9 on opposite sides of the shaft 15. The bell cranks 24 and 25 each has a weight 26 secured to the end of its outwardly extending arm which in normal position, when the shaft 2 is at rest, extends approximately parallel to the axis of the shaft 15. The sections of the bell cranks 24 and 25 which project radially of the axis of the shaft 15 when this shaft and the shaft 2 are at rest have substantially circular fulcrum heads 27 formed on their inner ends. The fulcrum heads 27 are held in the toroidal space 22 between the washers 20 and 21 and their circular perimeters engaging the walls of the spaces 22 permit pivotal movement of the bell cranks 24 and 25 on these heads as fulcrums.

Figure 3:
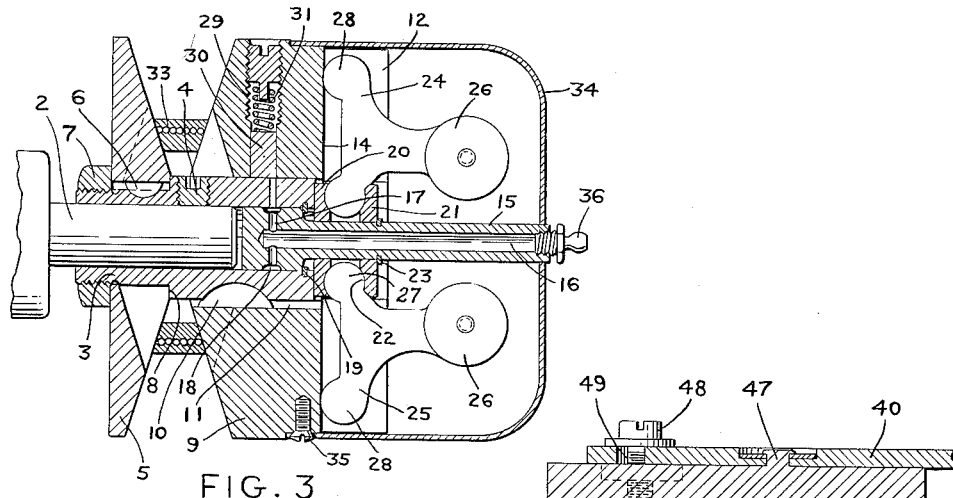
Figure 3 is a longitudinal section through the variable-pitch pulley on a larger scale than shown in Figure 1.
Figure 6:
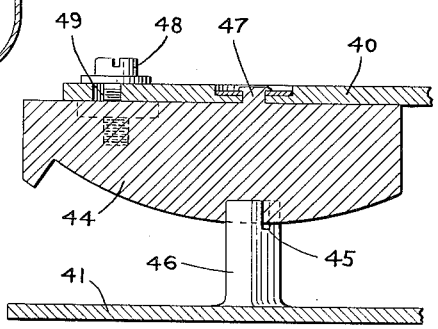
Figure 6 is a detail section taken on line 6—6 of Figure 2.
Figure 4:
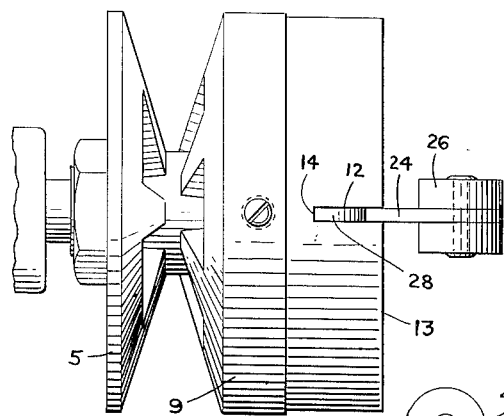
Figure 4 is a top plan of the variable-pitch pulley shown on the same scale as Figure 3.

The outer ends of the normally radial arm portions of the bell cranks 24 and 25 have heads 28 formed thereon, the edges of which are curved, as clearly shown in Figure 3 of the drawings and form contact surfaces for engagement with the inner abutment surface 14 of the slot 12.

The shiftable flange 9 is provided with a radially extending opening 29 therein in the inner end of which is located a plug 30 of any suitable friction material. The plug 30 is pressed against the sleeve 3 by a spring 31, the tension of which is regulated by a screw plug 32. By adjusting the screw plug 32 for tensioning the spring 31 the friction plug 30 may be forced into firm frictional engagement with the outer surface of the sleeve 3 or relieved from firm frictional engagement with the sleeve, as desired. The purpose of the friction plug 30 is to create sufficient friction to prevent the opening or increasing of the size of the V-shaped groove formed between the flanges 5 and 9 under weight of the V-belt 33 as the motor 1 comes to rest on being shut down.

A suitable housing 34 of sheet metal or any other suitable material encloses the bell cranks 24 and 25, the outer end of the flange 9 and the shaft 15, and is attached to the flange in any suitable manner such as by the screws 35. The outer end of the bore 16 of the shaft 15 is closed by a suitable grease nipple 36.

In operation, the rotation of the shafts 2 and 15 cause the bell cranks to be moved pivotally on their fulcrum heads 27 by centrifugal force acting upon the weights 26. The pivotal movement varies with the speed of rotation of these shafts and, consequently, the flange 9 is shifted axially relative to the flange 5 with a force varying as the square of the speed of the shaft 2. It is understood that the motor 1 is mounted slidably or movably upon its supporting base so that it may be moved towards or from the driven shaft or machine (not shown) for regulating the maximum speed of the driven shaft or machine (not shown).

From the foregoing description taken in connection with the drawings, it will be evident that the variable-pitch power transmitting pulley of the present invention possesses advantages over the conventional approved types of pulleys for this purpose insofar as it is possible to adjust the drive to low speed position while the motor is at rest. Many other advantages will also be apparent, among which is the fact that the variable-pitch pulley acts somewhat like a clutch, allowing the motor to start freely, without starting the load. Then as the motor picks up speed, the flanges 5 and 9 press against the sides of the V-belt under or by the axial sliding movement of the flange 9 under action of the bell cranks 24 and 25, and thus pick up the load gradually.

For the purpose of permitting the driven machine (not shown) to always start at low speed and pick up automatically to a predetermined maximum speed, the motor 1 is shown as mounted on a pivoted bracket or cradle 40, thus using the weight of the motor to effect the desired result. Moreover, by the provision of the pivoted bracket or cradle 40 for the motor 1 the V belt 33 can leave the variable-pitch pulley structure at any angle between the horizontal and the vertical, whereas with a sliding base such as is usually employed for the motors in conventional drives of this type the permitted angle of the belt is relatively small.

Figure 2:
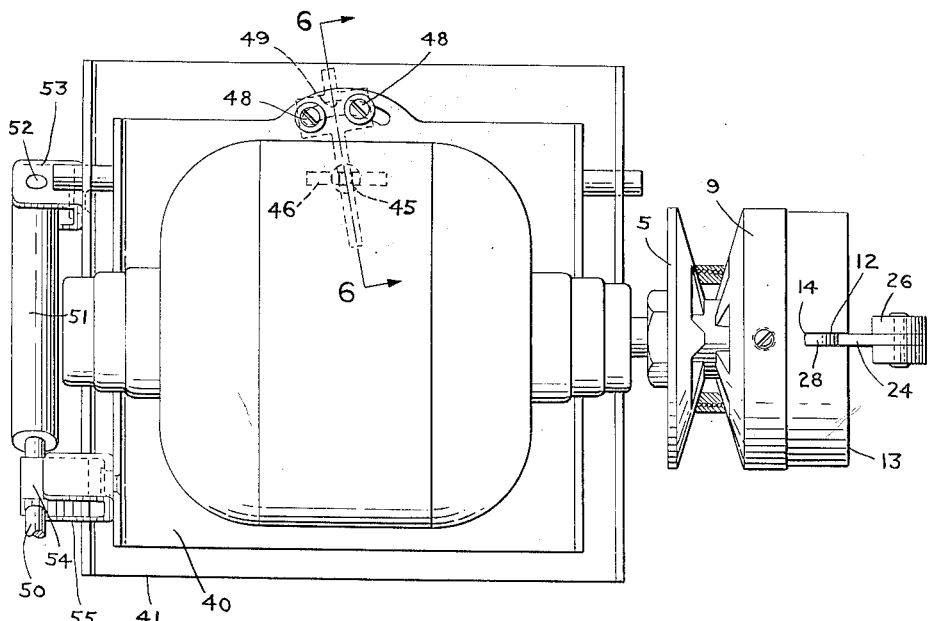
Figure 2 is a top plan of the variable speed drive.
Figure 5:
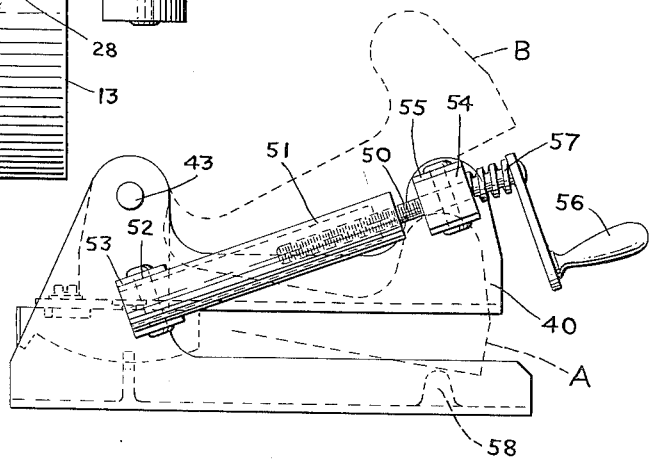
Figure 5 is a detail side elevation of the motor mounting.

The motor mounting includes a stationary base 41 which, in use, is bolted or otherwise suitably attached to any suitable support. The motor 1 is rigidly attached such as by being bolted to the bracket or cradle 40. The bracket or cradle 40 is pivotally connected to uprights 42 on the base 41 by means of suitable trunnions 43. In Figure 5 of the drawings the bracket or cradle 40 is shown in full lines in its horizontal position, which is the correct position during the setting up of the apparatus, and it is shown in dotted lines in its extreme high and low speed positions. The cradle or bracket 40 is narrower or of less width than the stationary base plate 41 as is clearly shown in Figure 2 of the drawings and it has an adjustable fin 44 on its under surface which engages in a slot 45 formed in the projection 46. The projection 46 is rigidly attached to the base plate 41 while the fin 44 is detachably and adjustably connected to the base of the cradle 40 by means of a pivoting fulcrum 47 and clamp screws 48 which extend through an arcuate slot 49 in the base of the cradle 40. The fin 44 engaging in the slot 45 provides a screw thread action to move the cradle or bracket 40 from side to side as its angle changes, thus maintaining alignment of the V belt 33 as it moves outwardly or inwardly on the conical face of the fixed flange 5. The purpose of the two clamp screws 48 and the arcuate slot 49 is to permit changing of the angle of the fin 44 in the event that the motor is mounted in the opposite direction from that shown in the drawings.

With the belt 33 in place and the motor 1 at rest the pivoted cradle 40 will assume approximately the low speed position indicated by the dotted line position "A" in Figure 5 of the drawings. As the motor starts and comes up to speed the thrust of the shiftable flange 9 against the side of the belt 33 will force it radially outward, lifting the pivoted cradle 40 to the solid line position shown in Figure 5 of the drawings. This position is not fixed, but is determined by the adjustment of a screw 50 and may be anywhere between the low speed position indicated by the dotted line position "A" and the high speed position indicated by the dotted line position "B." The screw 50 threads into a suitable cylindrical member 51 pivotally connected as shown at 52 by means of a bracket 53 to the base 41 and it extends through a suitable block 54 which is attached by means of a bracket 55 to the cradle 40. A handle 56 is attached to the screw 50 for rotating it and a spring 57 is coiled about the screw 50 between the handle 56 and the block 54 to provide a cushioning effect when the cradle 40 lifts and thus avoid a "bang" when it is brought to rest.

While in operation, the speed of the driven pulley (not shown) may be adjusted by rotating the screw 50 and so long as the setting of the screw 50 is not altered it will return automatically to the same speed when the motor 1 is started again after having been shut down.

In instances where the weight of the motor 1 is too great to be held by the belt 33 alone, as the cradle drops to its lower position, indicated by "A," a cushioning bumper 58 may be located beneath the cradle near its edge remote from its pivot points or, if it is so desired, a tensioning spring or any other suitable counter balancing or shock absorbing mechanism may be employed for cushioning the drop of the cradle.

It will be understood that the invention is not to be limited to the specific construction or arrangement of parts shown, but that they may be widely modified within the invention defined by the claims.

What is claimed is:

1. In a variable speed power transmission, the combination, of a driving shaft, a sleeve rigidly mounted on said shaft, a V-grooved pulley comprising a stationary flange keyed to said sleeve for rotation therewith and a movable flange feathered on said sleeve for axial movement relative to the sleeve and rotary movement with the sleeve, a second shaft aligning with and rotatable with said first-named shaft, bell cranks, means carried by said second shaft for pivotally supporting said bell cranks, fly-weights on said bell cranks, said movable flange having an abutment surface thereon, portions of said bell cranks engaging said abutment surface whereby as the bell cranks are moved on their pivots by the flying outward of said weights under centrifugal force said movable flange will be moved towards said stationary flange, a friction plug carried by said movable flange and engaging said sleeve, adjustable tensioning means for forcing said friction plug into engagement with said sleeve to vary the degree of responsiveness of the axial traverse movement of said movable flange in either direction under action of said fly-weights.

2. In a variable speed power transmission, the combination, of a driving shaft, a sleeve rigidly mounted on said shaft, a V-grooved pulley comprising a stationary flange keyed to said sleeve for rotation therewith and a movable flange feathered on said sleeve for axial movement relative to the sleeve and rotary movement with the sleeve, a removable second shaft aligning with and rotatable with said first-named shaft, bell cranks, means carried by said removable second shaft for pivotally supporting said bell cranks, fly-weights on said bell cranks, said movable flange having an abutment surface thereon, portions of said bell cranks engaging said abutment surface whereby as the bell cranks are moved on their pivots by the flying outward of said weights under centrifugal force said movable flange will be moved towards said stationary flange, said removable second shaft provided with a plurality of passages and openings to permit lubrication of the wearing surfaces of said sleeve and movable flange, a motor for driving said shaft, a stationary support, a cradle for supporting said motor pivotally connected to said stationary support, adjustable means for limiting the pivotal movement of said cradle and motor, a slotted projection on said stationary support, a fin adjustably carried by said cradle and engaging in the slot of said projection for moving the motor and cradle laterally during their pivotal movement on the pivots of the cradle.

3. In a variable speed power transmission, the combination, of a driving shaft, a sleeve rigidly mounted on said shaft, a V-groove pulley comprising a stationary flange keyed to said sleeve for rotation therewith and a movable flange feathered on said sleeve for axial movement relative to the sleeve and rotary movement with the sleeve, a second shaft aligning with and rotatable with said first named shaft, a plurality of washers carried by said second shaft and in spaced relation thereon and having their facing surfaces shaped to form a toroidal space, a plurality of substantially T-shaped bell cranks each having a rounded portion on one end of the cross bars thereof, said rounded portions engaging in said toroidal space for pivotally connecting the bell cranks to the shaft, the opposite ends of the cross bars of said bell cranks engaging said movable flange, and fly-weights on the ends of the leg bars of said bell cranks.

4. In a variable speed power transmission, the combination, of a driving shaft, a V-grooved pulley on said shaft and comprising a stationary flange on said shaft rotatable with the shaft and held against axial movement relative to the shaft, a movable flange rotatable with the shaft and axially movable relative to the shaft towards or from said stationary flange, fly weights connected to said movable flange to move it towards said stationary flange as said weights are thrown outwardly under centrifugal force, and adjustable friction means for retarding the axial traverse movement of the movable flange in either direction.

5. In a variable speed power transmission, the combination, of a driving shaft, a sleeve rigidly mounted on said shaft, a V-grooved pulley comprising a stationary flange keyed to said sleeve for rotation therewith and a movable flange feathered on said sleeve for axial movement relative to the sleeve and rotary movement with the sleeve, fly weights connected to said movable flange to move it towards said stationary flange as the weights are thrown outwardly under centrifugal force, and adjustable non-locking friction means carried by said movable flange and frictionally engaging said sleeve to retard but not present axial traverse movement of the movable flange toward or away from the stationary flange.

6. In a variable speed power transmission, the combination, of a driving shaft, a sleeve rigidly mounted on said shaft, a V-grooved pulley comprising a stationary flange keyed to said sleeve for rotation therewith and a movable flange feathered on said sleeve for axial movement relative to the sleeve and rotary movement with the sleeve, fly weights connected to said movable flange to move it towards said stationary flange as the weights are thrown outwardly under centrifugal force, a friction plug carried by said movable flange, a spring engaging said friction plug and forcing it into non-locking frictional engagement with said sleeve to retard axial movement of the movable flange towards or away from the stationary flange.

LOUIS EATON SHAW.

REFERENCES CITED

The following references are of record in the file of this patent:

UNITED STATES PATENTS

| Number | Name | Date |
|---|---|---|
| 2,078,196 | Heyer | Apr. 20, 1937 |
| 2,189,288 | Heyer | Feb. 6, 1940 |
| 2,249,297 | Muffett | July 15, 1941 |
| 2,287,326 | Reeves | June 23, 1946 |
| 2,459,377 | Hallinan | Jan. 18, 1949 |
| 2,479,764 | Morton | Aug. 23, 1949 |
| 2,543,967 | Heyer | Mar. 6, 1951 |

FOREIGN PATENTS

| Number | Country | Date |
|---|---|---|
| 435,257 | Great Britain | Sept. 18, 1935 |